US009586302B2

(12) United States Patent
Kampen et al.

(10) Patent No.: US 9,586,302 B2
(45) Date of Patent: Mar. 7, 2017

(54) METHOD FOR CYCLICALLY SCREENING A WORKING CHAMBER OPENING AND A SCREENING DEVICE FOR CARRYING OUT THE METHOD

(71) Applicant: WHEELABRATOR GROUP GmbH, Metelen (DE)

(72) Inventors: Berthold Kampen, Recke (DE); Josef Artmann, Duelmen (DE); Heinrich Dropmann, Metelen (DE)

(73) Assignee: WHEELABRATOR GROUP GmbH, Metelen (DE)

( * ) Notice: Subject to any disclaimer, the term of this patent is extended or adjusted under 35 U.S.C. 154(b) by 0 days.

(21) Appl. No.: 14/356,917

(22) PCT Filed: Nov. 5, 2012

(86) PCT No.: PCT/DE2012/100336
§ 371 (c)(1),
(2) Date: May 8, 2014

(87) PCT Pub. No.: WO2013/068001
PCT Pub. Date: May 16, 2013

(65) Prior Publication Data
US 2014/0311855 A1    Oct. 23, 2014

(30) Foreign Application Priority Data
Nov. 11, 2011 (DE) .......................... 10 2011 055 306

(51) Int. Cl.
*B23Q 11/08* (2006.01)
*B24C 9/00* (2006.01)
(Continued)

(52) U.S. Cl.
CPC ............... *B23Q 11/08* (2013.01); *B24C 3/20* (2013.01); *B24C 9/00* (2013.01)

(58) Field of Classification Search
None
See application file for complete search history.

(56) References Cited

U.S. PATENT DOCUMENTS

| 1,713,965 A | 5/1929 | Hull |
| 5,020,208 A * | 6/1991 | Feldmann ............... B21B 1/466 198/952 |

(Continued)

FOREIGN PATENT DOCUMENTS

| DE | 4408645 C1 | 3/1994 |
| EP | 0202338 A1 | 11/1985 |

(Continued)

OTHER PUBLICATIONS

European Search Report of German Application No. 10 2011 055 306.1.

(Continued)

*Primary Examiner* — Kavel Singh
(74) *Attorney, Agent, or Firm* — Karl F. Milde, Jr.; Eckert Seamans Cherin & Mellott, LLC (57) ABSTRACT

A method and apparatus for cyclically shielding a work chamber opening (25) when loading and unloading workpieces using a conveyor device (10) that passes through the work chamber opening. A first shielding element (21) is placed at a workpiece loading station (11.1), and a second shielding element (22) is placed behind a second workpiece placement location (11.2), as viewed in the conveying direction. When the first workpiece is loaded into the work chamber (20), the first shielding element (21) is placed at or in the work chamber opening (25) by advancing the conveyor device (10). The first shielding element (21) is then removed from the work chamber opening (25) and placed behind the second shielding element (22). These steps are repeated with subsequent workpiece placement locations (Continued)

(11.2, 11.3, . . . ) of the conveyor device (10) and with respective cross-over changes of the shielding elements (21, 22).

21 Claims, 8 Drawing Sheets

(51) Int. Cl.
 *B65G 47/00* (2006.01)
 *B24C 3/20* (2006.01)

(56) References Cited

U.S. PATENT DOCUMENTS 5,310,039 A * 5/1994 Butera ............... G01R 31/2851
 198/346.2
5,660,264 A * 8/1997 van der Schoot ..... B65G 23/30
 198/594

FOREIGN PATENT DOCUMENTS

| GB | 951996 | 3/1964 |
|---|---|---|
| JP | 10328964 A | 12/1998 |

OTHER PUBLICATIONS

International Search Report of PCT Application No. PCT/DE2012/100336.

* cited by examiner

METHOD FOR CYCLICALLY SCREENING A WORKING CHAMBER OPENING AND A SCREENING DEVICE FOR CARRYING OUT THE METHOD

BACKGROUND OF THE INVENTION

The invention relates to a method for cyclically shielding a work chamber opening when loading and unloading workpieces as well as a shielding device for carrying out the method.

Work chambers are used for the treatment of workpieces, in particular for surface treatment with abrasive or surface-compacting particles, in order to protect the surroundings from the blasting agents flying about. The workpieces are transported into the work chamber through an opening in the work chamber wall. The opening is then closed and the blasting agent is blasted onto the workpiece using turbine wheels or pneumatic blasting agent nozzles. The disadvantages of such a discontinuous method are the required set-up times for stopping the blasting agent supply, opening the work chamber opening, moving the workpiece in and closing the work chamber opening and re-starting the blasting agent supply and the treatment process. Such a method is uneconomical especially for large numbers of small workpieces.

It is also known to place workpieces on a cyclically movable, in particular a round, feeding device that loads the workpiece into the work chamber through a first opening and unloads it from there through an additional opening. The advantage is that the workpiece can be already placed onto the exterior portion of the conveyor device outside the work chamber while the treatment of other workpieces is still in progress inside the working chamber. The workpieces that have been moved out of the work chamber earlier can at the same time be taken off the conveyor device. Thus, at least the entire cycle time required for treatment with the blasting agent on the inside of the work chamber is available for mounting the next untreated workpieces and for removing the workpieces that have previously finished the treatment. Such a method allows for a quasi-continuous, albeit intermittent loading of the workpieces into the work chamber and unloading from there.

So-called rotating satellite tables that protrude from the work chamber with a portion of their peripheral circumferential area and that have multiple mounting devices for workpieces can be used as the conveyor device, for example. The rotating satellite table is turned cyclically by one angle step each time such that a new workpiece arrives in the work chamber while at the same time another one is rotated out of the working chamber. After its removal, at least one space for a new placement of an additional untreated workpiece is available. The problem in this case, however, is shielding the work chamber openings, which are provided for moving the workpieces in and out, from the blasting agents flying about in the working chamber. If the openings are not sealed, then the blasting agents can exit the work chamber unrestricted and can endanger persons and objects in the immediate vicinity due to their high kinetic energy.

If a batch continuously uses the same kind of workpieces, then a partial sealing of the openings can be achieved via so-called template seals, which have an opening that is adapted precisely to the projected contour of the workpiece and through which the workpiece can pass during the cyclical advance. However, even with the template seal, the contour of the opening provided for the passage of the workpiece remains completely free allowing the unrestricted exit of blasting agent from the working chamber.

Blasting agent curtains are also known. In this case, the blasting agent is supplied into a linear funnel above the work chamber opening. The blasting agent exits at the funnel mouth and thus covers the entire area of the opening. The mass of the down-pouring blasting agent veil is so great that it can compensate for the impulse of the blasting agent particles that stem from the turbine wheels or blasting nozzles such that the particles drop down together with the blasting agent veil, where the blasting agent is caught and is returned to the cycle. The continuous turnover of the blasting agent to maintain the veil requires high structural expenditures and, due to the great turned over mass, also needs significant drive energy for the conveyor equipment employed. Also disadvantageous is that outward protruding contours of the workpiece act like an umbrella such that gaps are present in the blasting agent veil underneath, which again allows for blasting agent to exit into the surrounding area.

Known from JP 10328964 A is a work chamber system having a movable separation wall. The separation wall closes an opening for safety reasons but must then be moved to the side for the next angle step of the rotating table. In the particular application presented here, the opening would be exposed and blasting agent would escape at the moment when the plate is moved. Thus, a quasi-continuous operation without interruption of the blasting agent supply is not possible.

DE 198 26 074 C1, originating from the applicant, discloses a work chamber system having one work chamber with loading and unloading in a ring system and sealed via doors. Individual rotating conveyor arms are provided for each workpiece placement location. Since the conveyor arms can be moved individually, workpieces can be moved in and out of the work chamber via interim gates. Although a good seal is achieved at the interim gates, a great effort must be made to drive the individual conveyor arms independently of each other and to seal them in a guide in the work chamber wall.

SUMMARY OF THE INVENTION

The problem addressed by the present invention therefore is to provide a method for cyclically shielding a work chamber opening as well as a suitable shielding device.

This problem is solved, according to the invention, first by a method for loading the workpieces, and second by a method for unloading the workpieces.

Furthermore, the problem is solved by a shielding device which implements the aforesaid methods.

Essential to the invention is, therefore, that a cross-over use of shielding elements is mechanically operated.

During loading, the workpiece is preferably moved initially from a workpiece placement location at the conveyor device, which is easy to reach by a worker, to a preparation position that may be located in a pre-gate upstream of the actual work chamber opening. Therein, a shielding element, in particular one that is plate-shaped, is placed on the conveyor element on the side of the workpiece that faces the work chamber opening.

The conveyor device is then moved in the conveying direction by a defined distance of movement, in particular—in case a rotating satellite table is used—by a certain angle step, wherein for the preferred variant of the method the workpiece is moved info the work chamber and the shielding element that is located directly behind in the conveying direction is placed directly in front of or into the work chamber opening and closes the opening.

A workpiece can already be placed on the rear side of this first shielding element, when viewed in the conveying direction. And yet another identical shielding element can be placed behind this one. During the next operational step, the shielding element located at the work chamber opening is first pulled up then taken back beyond the second shielding element that is on standby into the next following receiving position. Thereafter, the conveyor device travels by another sequential step, which moves a new workpiece into the work chamber and the shielding element located behind it closes the opening.

The cycle then continues to repeat with regard to the cross-over change of the first and the second shielding element.

With regard to the invention, shielding refers only to the fact that a deflector surface is placed in front of the work chamber opening such that the particles that fly from the chamber are striking against it and can be deflected to the side or up or down. Hermetic sealing of the work chamber opening is not necessarily required to solve the problem addressed by the invention.

For this reason, the shielding elements can be placed directly into the work chamber opening or placed in order to rest on the exterior work chamber wall using a suitable shape adaptation of the shielding element as well as of the frame of the work chamber opening.

However, it is sufficient for most applications to place the shielding elements at a certain distance such that the direct trajectory of the particles from the blasting agent source in the interior through the work chamber opening into the environment is interrupted.

As an alternative to plate-shaped shielding elements that are placed between the workpiece placement locations of the conveyor device and the workpieces placed there, cup- or box-like shielding elements can be used and put over workpieces with their openings facing downward. They are moved to or into the work chamber opening similar to the plate-shaped shielding elements described above.

Preferably, this procedure is applied at both the inlet and outlet opening of the working chamber, i.e., during loading of a workpiece into the work chamber and when unloading it from there.

Preferably, partitioning is performed such that the shielding elements are inserted into corresponding holders of the conveyor element, in particular of the rotating satellite table, wherein a catch element extends upward from the work chamber or a gate cover attached thereto, said catch element being guided in a connecting sliding guide at the top, such that the catch element carries out a defined path in the cyclic movement of the conveyor device in the upper area.

The sliding guide does not necessarily have to steer the catch element. Rather it is sufficient that the sliding guide enables an unrestricted movement of the catch element that extends upward.

When the respective next position is reached, the catch element can be gripped from the outside in order to pull up the shielding element that is located in front when viewed in the direction of the movement at the beginning of a new cycle, and lower it again at a rear position. This procedure with the shielding elements inserted into the conveyor device has the advantage that the advance of the shielding elements is carried out in the one direction by the conveyor device itself and that there is only one transporting device required for the shielding elements in order to return the shielding elements against the conveying direction. In this way, no complicated multiple transport devices for the shielding elements are required, which would have to be designed such that they would not interfere with each other when one transport device is advanced and simultaneously the other transport device together with the respective shielding elements hanging thereon is withdrawn.

During unloading, the direction of the conveyor device's movement is almost identical with respect to the conveying direction; however it is reversed with respect to the work chamber opening and thus handling of the shielding elements changes as well.

That is to say, in this case the conveyor device performs with its movement the removal of the respective shielding element from the work chamber opening, whereas the transporting device must return the respective other shielding element against the conveying direction to the work chamber opening.

The present invention also includes a device suitable for carrying out the methods described above. It is suited for the loading and unloading variation, wherein only the control must be adapted appropriately in order to represent the differing directions of the movement.

The preferably provided pin elements at the lower edge of the shielding elements engage in bore holes of the conveyor device, which in particular is a round rotating satellite table.

To avoid jamming in of the pins inserted into the rotating table, especially also when blasting agent is added, sufficient clearance must be provided between the recesses in the rotating table and the pins. Initially this has the disadvantage that the shielding elements used in the rotating table are not aligned exactly vertical, but may tilt due to the big play as soon as the catch element has been released by the transport device. The sliding guide does restrict this potential tumbling tilting movement to a direction tangential to the direction of transport. Still, the catch element that protrudes upward is not always at a reproducible position at the front removal position.

Nevertheless, to enable secure gripping by the transport device for the purpose of lifting, it is in particular provided that the catch element carries at its end a coupling element in the manner of a crossbar, which is formed out-of-round at the top side and round at the bottom side. At the same time, a counter piece to the out-of-round upper part of the bar element is formed at a support element of the transport device.

For example, the upper part of the bar element can be designed prismatic with an edge pointing upward. The receiving element of the transport device then has a V-shaped groove compatible to the edge. If the bar element is pressed with its upper side into the receiving element, there is a forced alignment and centering together with the shielding device hanging thereon by the form-fitting connection. In order to grip the bar element and draw it into the receiving element, the bottom of the bar element is rounded, such that an also rounded fork with a movement similar to an excavator bucket can reach under the bar element, wherein the round design allows the claw to slide off the bar element.

A sliding guide creating the shape of an "H" is present at the upper side of the device, having two parallel slots—or in the case of a rotating table, oriented on the same partial circle two radial slots, corresponding to the insertion and removal position of the shielding elements, as well as having at least one channel running between them and parallel to the direction of movement of the inserted catch element. In case of a circular movement this channel has the shape of a circular arc.

The H-shaped motion link is preferably part of an additional shielding gate in front of the work chamber through which the drives for raising and lowering as well as for reverse transport of the shielding elements are shielded from the conveyor track and the work chamber opening. This protects the drives from leakage streams containing blasting agent. Only the catch element protrudes through the H-shaped sliding guide to the outside and is sealed using brush seals, for example, which allow inserting and retracting the shielding elements at the intended positions and also the travel from the insertion to the removal position using the catch element that protrudes at the top.

Another advantageous embodiment provides that a template seal as is essentially known from the prior art is placed into or directly at the work chamber opening for workpieces that are to be treated similarly. This restricts the opening area of the work chamber opening to the necessary minimum.

For a full understanding of the present invention, reference should now be made to the following detailed description of the preferred embodiments of the invention as illustrated in the accompanying drawings.

DESCRIPTION OF THE PREFERRED EMBODIMENTS

The preferred embodiments of the present invention will now be described with reference to FIGS. 1-5d of the drawings. Identical elements in the various figures are designated with the same reference numerals.

Figure 1:
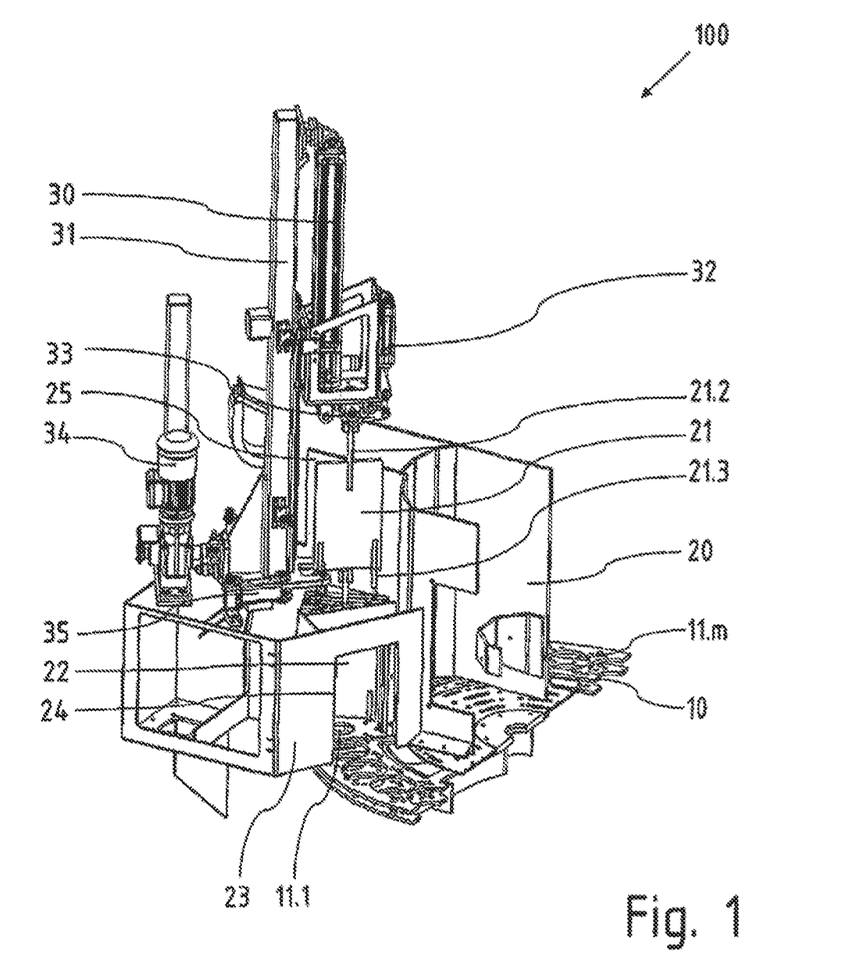
FIG. 1 is a perspective view of a shielding device according to a preferred embodiment of the present invention.

FIG. 1 shows a shielding device 100 in the left area of a work chamber 20. It comprises an additional gate 23 that is placed in front of the actual work chamber opening, which is not visible here. The latter comprises a gate opening 24 that allows unrestricted access to the workpieces placed on the conveyor device 10.

Behind the wall 20, visible in FIG. 1, in the upper right area of the figure is the actual working chamber, while the area at the lower edge of the image is freely accessible. There, several workpiece placement locations 11.1 are freely accessible at a conveyor device, such that workpieces can be prepared there.

Another shielding device is designed in mirror image and is placed in the right area in the position of the work chamber shown in FIG. 1.

A conveyor device 10 is designed as a rotating satellite table, as is essentially known, and has a plurality of workpiece placement locations 11.1, 11.2, . . . , 11.m (cf. FIG. 2) in an outer area that has the shape of a circular ring. The top side has a planar design and moves directly along the lower edge of the working chamber's 20 wall. Blasting agent enters through the openings in the conveyor device 10 is caught in the lower area and removed from the working chamber.

The actual shielding device 100 essentially comprises two plate-shaped shielding elements 21, 22 and a transporting device for the transfer thereof.

The transporting device is subdivided into a lifting device 30 and a transfer device.

At their top side, the shielding elements 21, 22 each have at least one bar-shaped catch element 21.2, 22.2, where at least one coupling element 21.1, 22.1 is located. At their bottom side, they each have at least one pin 21.3, 22.3 that can be inserted into a receiving recess in the conveyor device 10.

The lifting device 30 comprises a linear drive or a pneumatic cylinder that is suspended at a portal 31. If can be used to raise or lower a gripping device 32. The gripping device 32 opens and closes a claw-like gripper 33 with which the coupling element 21.1, 22.1 can be gripped at the end of the catch element 21.2, 22.2.

The transfer device comprises an arc-shaped guide rail 35 and a drive 34 with motor and gears. A slide carriage on which the entire lifting device 30 is mounted is supported by the guide rail 35. In this manner, the lifting device 30 can be moved parallel to the circular arc shaped direction of movement of the shielding elements 21, 22 that are placed on the conveyor device 10.

Figure 2:
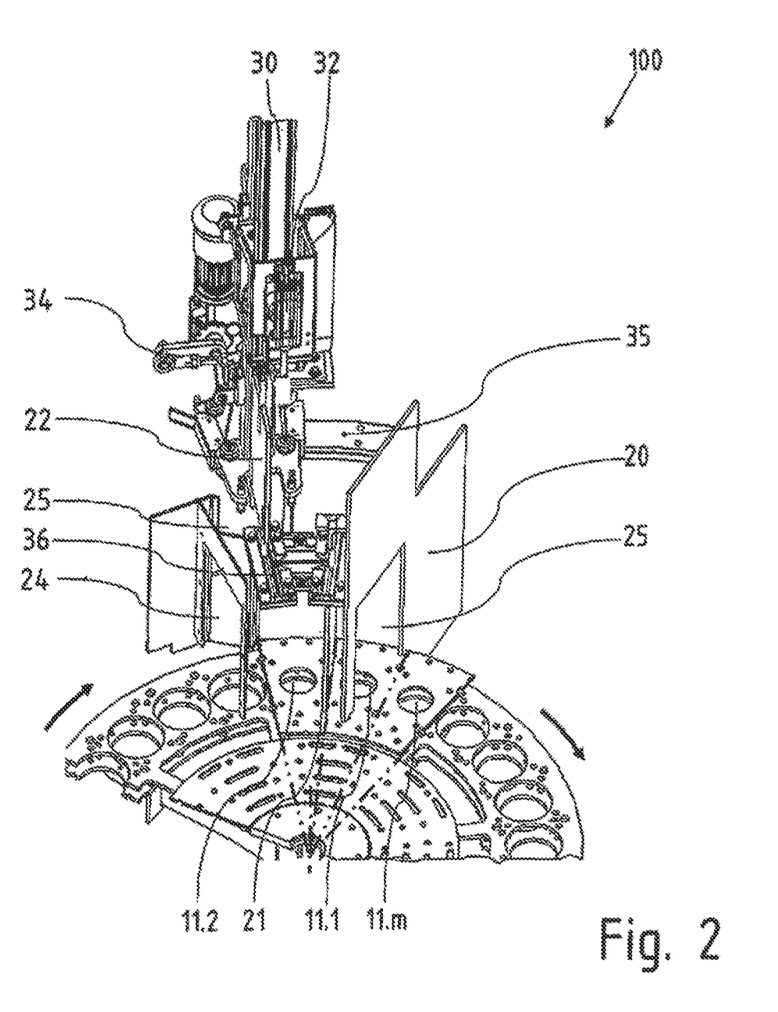
FIG. 2 is a first perspective view of parts of a shielding device of FIG. 1.

FIG. 2 shows parts of the shielding device 100 in a radial viewing direction from the inside of the working chamber, wherein significant parts of the casing are not shown. Visible from the work chamber are only parts of the additional gate 23 with the gate opening 24 on the left and a work chamber wall 20 with a work chamber opening 25.

The conveyor device 10 rotates under these shieldings. At its top side, it is divided into several segments that form the individual workpiece placement locations 11.1, 11.2, . . . , 11.m. The mounting devices for the workpieces vary depending on the type of workpiece and are not shown here.

In FIG. 2, a first shielding element 21 is inserted between the workpiece placement locations 11.1, 11.2. Its bar-shaped catch element extends upward though a stationary sliding guide 36. A second shielding element 22 has been gripped using gripper 33 and has been raised by the lifting device 30. The transfer device has moved the lifting device 30 on the guide rail 35 to the left, counter to the conveying direction, which is indicated by the arrows. There, the lifting device 30 is now ready to lower the second shielding element 22 through the sliding guide 36 down to the rotating table.

The sliding guide 36 has an H-shaped design with two cross-slots oriented perpendicular to the conveying direction and the shielding elements 21, 22 can be moved in and out through it, and it has a longitudinal slot that leads into the cross-slots and through which the catch element 21.2, 22.2 can be moved in the conveying direction.

Figure 3:
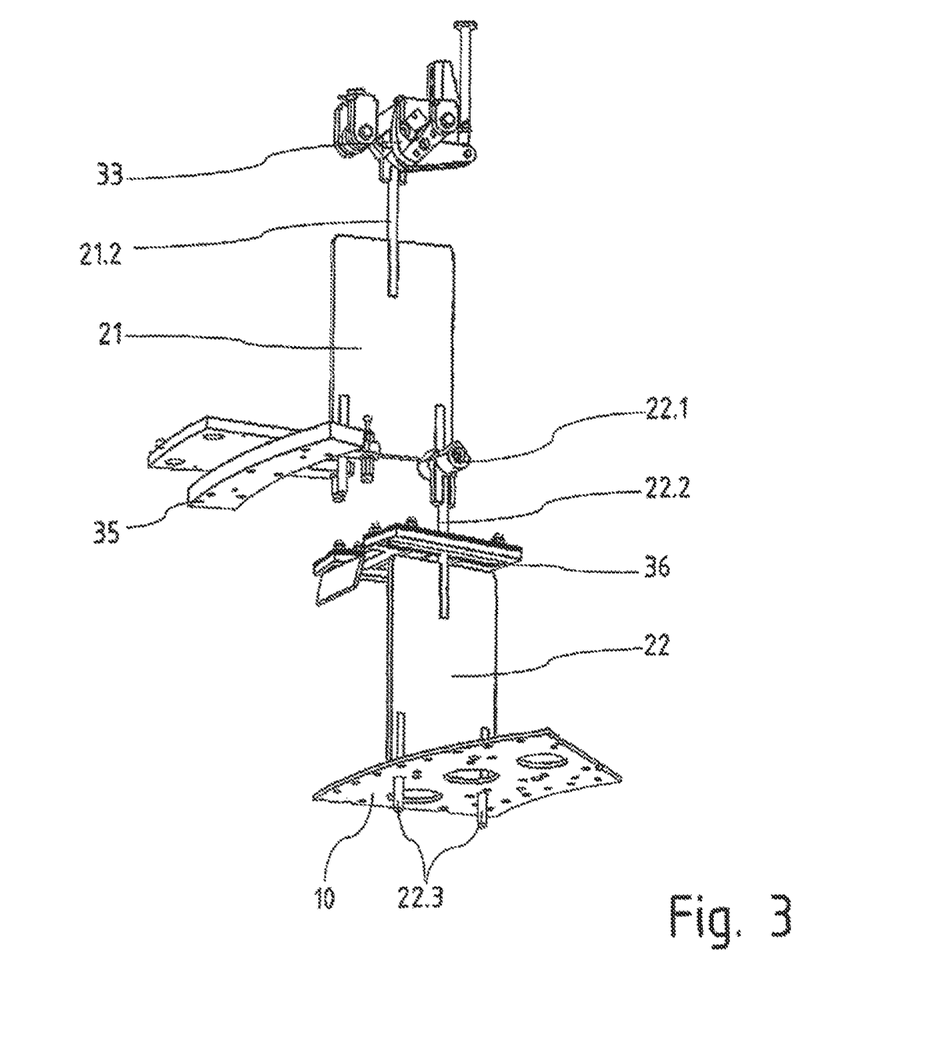
FIG. 3 is a second perspective view of parts of a shielding device of FIG. 1.

FIG. 3 shows a perspective view of the essential parts of the shielding device 100 in the same position as in FIGS. 1 and 2 from the outside bottom.

Clearly visible are the pins 21.3, which extend from the bottom side of the shielding element 21 towards, where they are inserted in recesses in the conveyor device 10. Through this formfitting connection, the shielding elements are arranged at the conveyor device 10 and can be taken to the next position with the respective cyclical movement of the conveyor device 10.

Figure 4:
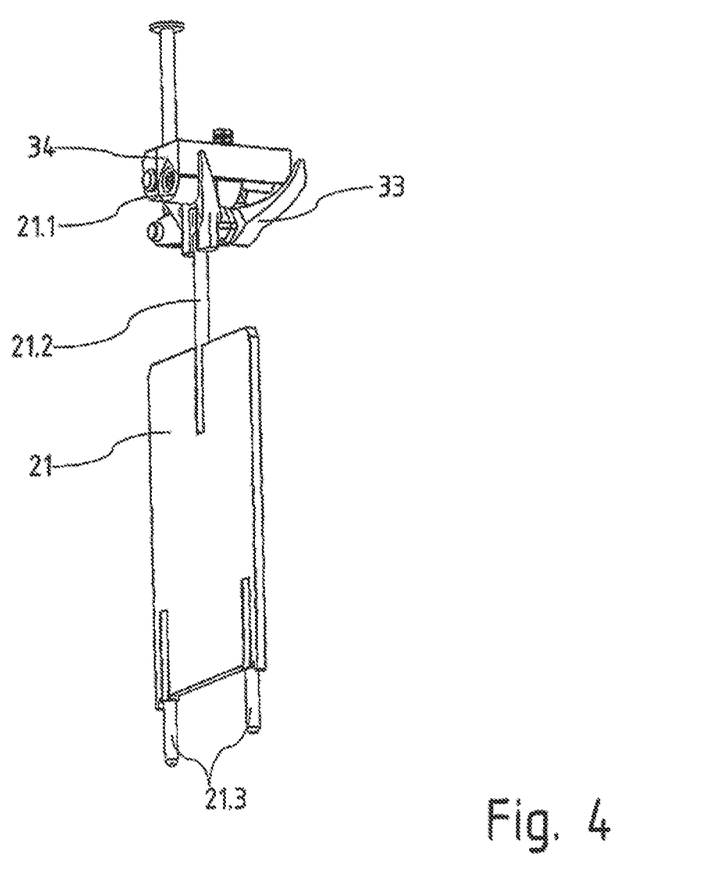
FIG. 4 is a perspective view of a shielding element shown in FIG. 3.

As can be recognized in particular in FIG. 4, the catch element 21.2 ends at the top side in a coupling element 21.1 that has a prismatic design at the top and thus has an edge that points upwards. A receiving element 34 at the gripping device is designed compatible thereto. The coupling element 21.1 is rounded at the bottom side and the gripping device has arc-shaped claws that at the right and left reach past the catch element under the coupling element 21.1.

The result of the described design is that the entire shielding element is centered relative to the gripping element when the claws 33 are closed. Initially, the rounded claws 33 slide over the rounded bottom side of the coupling element 21.1 and at the same time draw the upper prismatic area into the receiving element 34 such that a form-fitting fixing is achieved in multiple directions.

A shielding element 21 that may be askew relative to the horizontal direction of the conveyor device's 10 movement due to the large clearance between the pin 21.3 and the recesses in the conveyor device 10, where the pins 21.3 are inserted, is thus returned to a defined position when gripped.

The sequence of movement in the method according to the invention is explained in greater detail based on the following FIGS. 5a to 5d.

Each one shows shielding devices 100 at a closed work chamber 20. Here the conveyor device's 10 direction of rotation is clockwise such that loading occurs at a work chamber opening 25 in the left image area and unloading at a work chamber opening 27 in the right image area. The lower image area is outside the work chamber 20. There, some workpiece placement locations 11.1 . . . 11.5 are freely accessible for loading and unloading of workpieces 201 . . . 204.

Figure 5A:
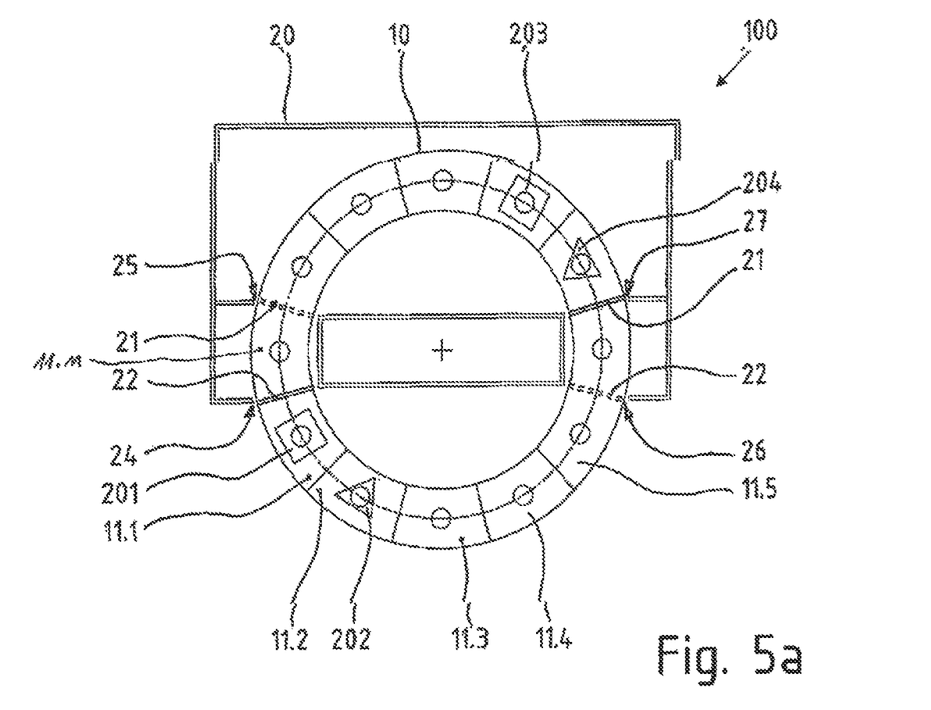
FIGS. 5a-5d are schematic diagrams, viewed on the top, of the shielding device according to the present invention.

FIG. 5a shows a situation in which already two workpieces 203, 204 are located inside the work chamber 20. Two workpieces 201, 202 are placed on the conveyor device 10 outside of the work chamber 20 at workpiece placement locations 11.1, 11.2. In the previous production step, the work chamber opening 25 was closed by a first shielding element 21, which has now been raised, as indicated by the dashed presentation of the line that symbolizes the shielding element 21. A second shielding element 22 is placed behind it, in the clockwise conveying direction.

Figure 5B:
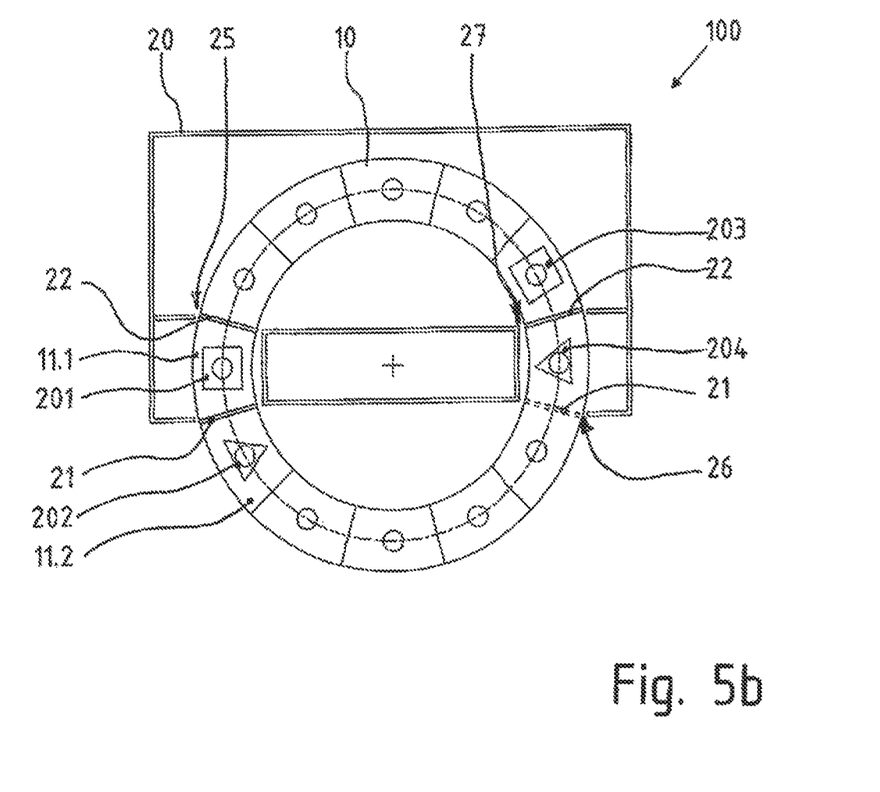

As soon as the conveyor device 10 is rotated by another angle step in clockwise direction, the second shielding element 22 arrives according to FIG. 5b at or in the work chamber opening 25.

The first workpiece placement location 11.1 with the first workpiece 201 is now located in the gate between the work chamber opening 25 and the opening 27 in the enter cover of the gate.

Between the first workpiece placement location 11.1 and the second workpiece placement location 11.2, the other shielding element 21 is already inserted into the conveyor device 10. However, it could also still remain in a raised position above.

Still in the situation according to FIG. 5b, the workpiece 204 has arrived at the unloading side in the gate between openings 27 and 26. The workpiece 203 is still located inside the work chamber 20.

The work chamber opening 27 for unloading is closed by a shielding element 22. The other shielding element 21 is located outside the work chamber 20 and can already be raised.

Figure 5C:
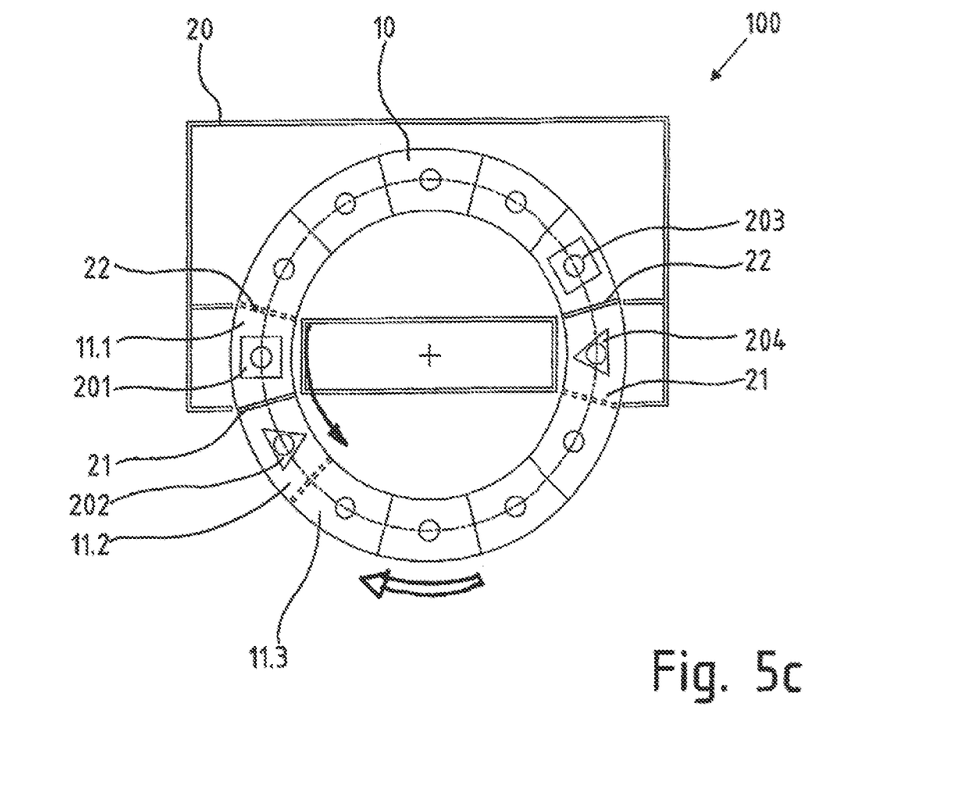

FIG. 5c shows the next step of the sequence. The conveyor device 10 is still unchanged, such that the position of the workpieces 201 . . . 204 is also still unchanged. The shielding element 22 located at the work chamber 25 is raised and transitioned to the position after the next one according to the direction of the arrows drawn in the inner circle counter to the rotating direction of the conveyor device 10. The conveyor device 10 is then rotated by one angle step as indicated by the arrow at the outer side.

Figure 5D:
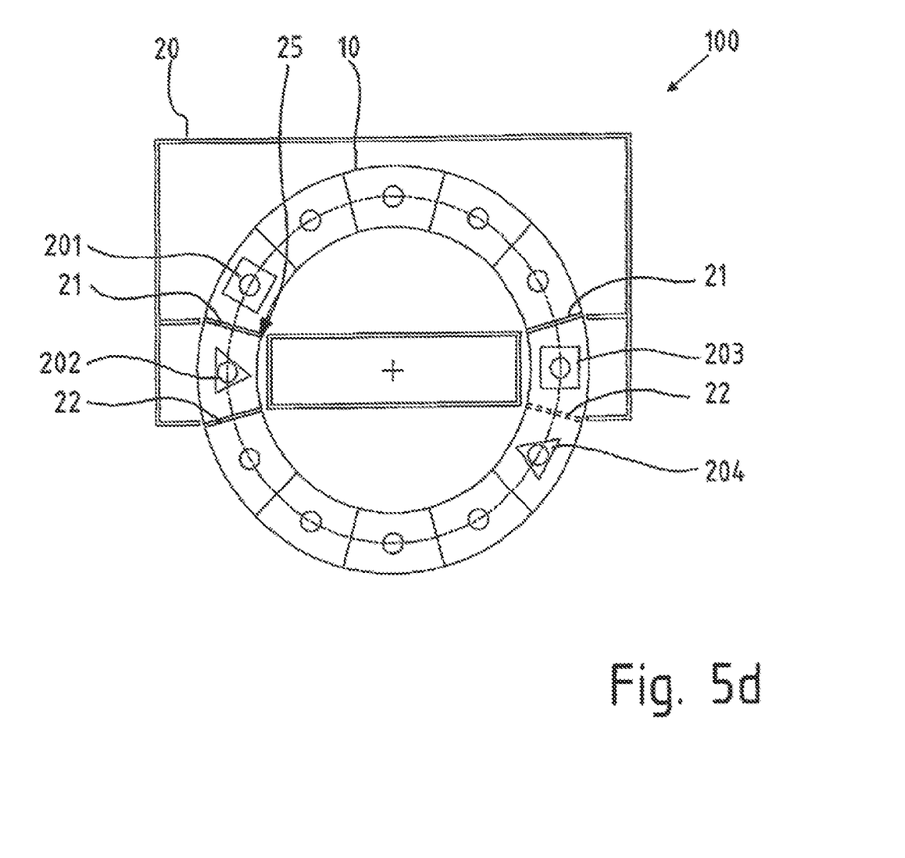

The position shown in FIG. 5d is then reached. The workpiece 201 is now located inside the work chamber 20 at the loading side. The work chamber opening 25 is covered by the shielding element 21. The other shielding element 22 is located behind the second workpiece 202 in standby.

At the unloading side, the workpiece 204 has now fully exited the work chamber 20 and also the gate behind the work chamber opening 27. At the same time, the shielding element 22 has been transported with the conveyor device. For the cross-over change, the other shielding element 21 has been placed from the position according to FIG. 2c to the work chamber opening 27.

The cycle of changing the shielding elements 21, 22 at the loading and unloading side according to FIG. 5b to 5d is repeated with the other work pieces that are positioned at the subsequent workpiece placement locations 11.3.

There has thus been shown and described a novel method for cyclically screening a working chamber opening, and a screening device for carrying out the method, which fulfill all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other and applications which do not depart from the spirit and scope of the invention are deemed to be covered by the invention, which is to be limited only by the claims which follow.

The invention claimed is:

1. A method for cyclically shielding an inlet opening in a work chamber when loading workpieces into said chamber using a conveyor device having a succession of workpiece placement locations that cyclically move through a workpiece loading station located outside of said chamber adjacent said opening and thereafter pass through the work chamber, said method comprising the following steps:
   (a) placing a first workpiece on a workpiece placement location of the conveyor device at the workpiece loading station;
   (b) placing a first shielding element on the conveyor device in front of the first workpiece placed thereon, as viewed in the conveying direction;
   (c) placing a second shielding element on the conveyor device behind the first workpiece placed thereon, as viewed in the conveying direction;
   (d) loading the first workpiece that was placed on the conveyor into the work chamber and placing the second shielding element at the work chamber opening by advancing the conveyor device;
   (e) placing a second workpiece on a workpiece placement location of the conveyor device at the workpiece loading station;
   (f) removing the first shielding element from the conveyor device and placing the same on the conveyor device behind the second workpiece that was placed thereon, as viewed in the conveying direction, by using a transporting device; and
   (g) repeating steps (d) (e) and (f) with successive workpiece placements on the conveyor device at the workpiece loading station and with respective cross-over changes of the shielding elements.

2. A method as in claim 1, wherein the shielding elements are positioned between the workpiece placement locations and the workpieces placed there.

3. A method as in claim 1, wherein container-shaped shielding elements are used that are positioned on the workpiece placement locations and are put over the workpieces placed there.

4. A method as in claim 1, wherein the shielding elements are set onto the conveyor device.

5. A method as in claim 1, wherein the shielding elements are inserted into the upper side of the conveyor device.

6. A method as in claim 1, wherein a continuous conveyor device is used that leads into a first work chamber through a first work chamber opening and leads out of it at a second work chamber opening.

7. A method as in claim 6, wherein a rotating satellite table is used as the conveyor device, where the workpiece placement locations are arranged in a circular, ring-shaped area.

8. A method for cyclically shielding an outlet opening in a work chamber when unloading workpieces from said chamber using a conveyor device having a succession of workpiece placement locations that cyclically pass through the chamber and thereafter move past a workpiece unloading station located outside of said adjacent said opening, said method comprising the following steps:
   (a) placing a first shielding element on the conveyor device at the work chamber opening;
   (b) one moving a workpiece that is positioned on a first workpiece placement location of the conveyor device through the work chamber opening, and advancing the first shielding element, by advancing the conveyor device;
   (c) placing a second shielding element on the conveyor device at the work chamber opening behind the first shielding element, as viewed in the conveying direction, and behind the first workpiece placement location using a transporting device;
   (d) removing the workpiece from the conveyor device at the workpiece unloading station; and
   repeating steps (b), (c) and (d) with regard to the additional, successive workpiece placement locations and with cross-over changes of the shielding elements.

9. A method as in claim 8, wherein the shielding elements are positioned between the workpiece placement locations and the workpieces placed there.

10. A method as in claim 8, wherein container-shaped shielding elements are used that are positioned on the workpiece placement locations and are put over the workpieces placed there.

11. A method as in claim 8, wherein the shielding elements are set onto the conveyor device.

12. A method as in claim 8, wherein the shielding elements are inserted into the upper side of the conveyor device.

13. A method as in claim 8, wherein a continuous conveyor device is used that leads into a first work chamber through a first work chamber opening and leads out of it at a second work chamber opening.

14. A method as in claim 13, wherein a rotating satellite table is used as the conveyor device, where the workpiece placement locations are arranged in a circular, ring-shaped area.

15. A work chamber for blasting treatment of workpieces comprising:
   at least one blasting agent source disposed in the interior of the work chamber for blasting workpieces with abrasive or surface-compacting particles;
   an inlet gate having an inlet opening and a first and a second shielding device, each shielding device having at least one deflector surface;
   an outlet gate having an on open in and a first and a second shielding device, each shielding device having at least one deflector surface;
   a convey device extending through the inlet and outlet gates of the work chamber and having multiple workpiece placement locations, where at least one receptacle is provided for each of the shielding elements; and
   a transporting device arranged in each of said inlet gate and in said outlet gate, each transporting device having a lifting device for raising and lowering a gripping device configured to receive the shielding elements and a transfer device for moving the lifting device along the conveyor device;
   wherein each transporting device is operative to place the shielding devices in the respective inlet and outlet opening, such that the direct trajectory of the particles from the blasting agent source is intercepted by the deflector surfaces.

16. A work chamber as in claim 15, wherein the shielding elements have at least one pin at their bottom side that can be inserted into a receptacle in the upper side of the conveyor device.

17. A work chamber as in claim 15, wherein the shielding elements each have at their upper side at least one catch element, on which at least one coupling element is arranged.

18. A work chamber as in claim 17, wherein the catch element is designed in the shape of a bar and extends through a stationary sliding guide.

19. A work chamber as in claim 18, wherein the sliding guide has an H-shaped design with two cross-slots oriented perpendicular to the conveying direction into which the shielding elements can be moved and with a longitudinal slot that leads into the cross-slots and in which the catch element can travel.

20. A work chamber as in claim 17, wherein the coupling element has a prismatic design at its upper side and wherein the gripping device has a catch element that is compatible thereto.

21. A work chamber as in claim 17, wherein the coupling element is rounded at its bottom side and wherein the gripping device has concave claws.

\* \* \* \* \*